(No Model.)

E. MOON.
FLOOD GATE.

No. 535,848. Patented Mar. 19, 1895.

Witnesses
Inventor
Elihu Moon
per Rhesa G. DuBois
Attorney

UNITED STATES PATENT OFFICE.

ELIHU MOON, OF MAYDAY, KANSAS.

FLOOD-GATE.

SPECIFICATION forming part of Letters Patent No. 535,848, dated March 19, 1895.

Application filed October 2, 1894. Serial No. 524,711. (No model.)

*To all whom it may concern:*

Be it known that I, ELIHU MOON, a citizen of the United States, residing at Mayday, in the county of Riley and State of Kansas, have invented certain new and useful Improvements in Flood-Gates; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to gates especially designed for closing the gap usually left in a line of fencing at the point where the fence crosses a streamlet, gully, or ravine so as to yield to any abnormal pressure during a freshet from the accumulation of trash, logs, rails, timber and floating matter to permit the passage of the same without working injury to the gate.

The purpose of the invention is the provision of a flood gate, simple in construction, durable and lasting when properly set, efficient and satisfactory in results and capable of being stored in a compact form and readily erected.

The improvement consists of the novel features which hereinafter will be more fully described and claimed and which are shown in the annexed drawings, in which—

Figure 1:
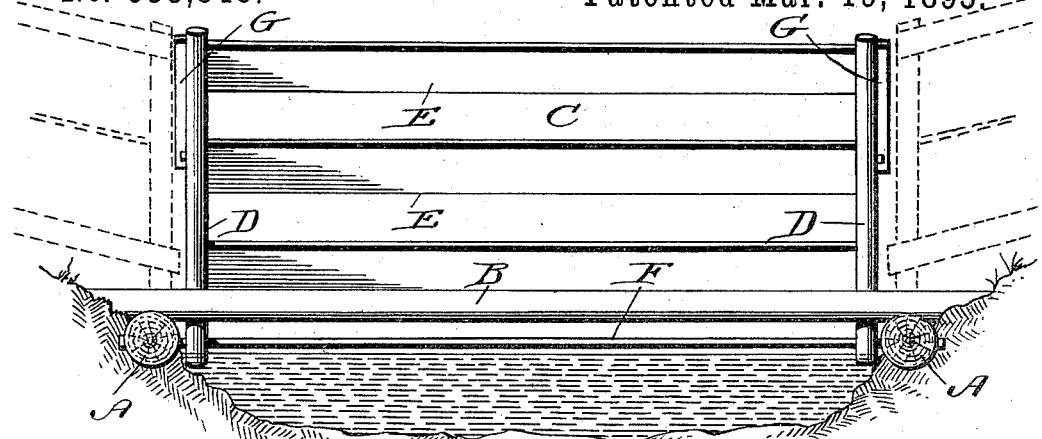
Figure 2:
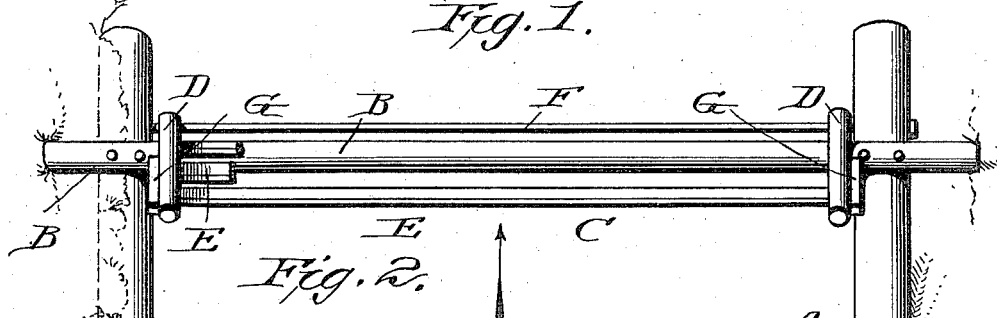
Figure 3:
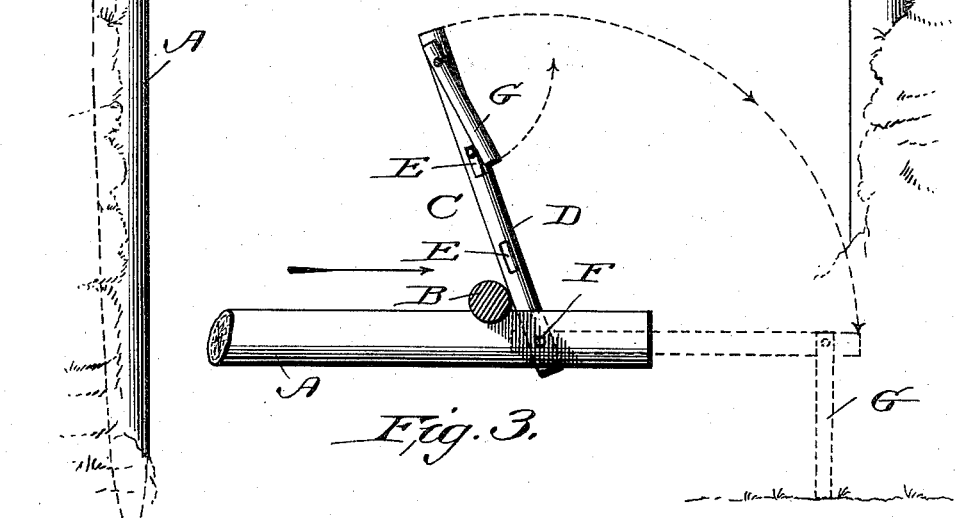

Figure 1 is a front view of the flood gate. Fig. 2 is a top plan view, and Fig. 3 is a side elevation of the invention.

The anchoring logs A, two in number, are disposed one on each side of the streamlet, gully or ravine parallel with the banks thereof and with each other, and taper in length toward one end. These logs are securely anchored in the said banks by being embedded therein to a proper depth. The pointed or tapering ends extend up-stream. The down-stream ends are connected and braced by a pole B, the latter being secured near its ends to the ends of the logs A and extending across the bed of the stream.

The gate C is hinged to the logs A and normally inclines to the vertical up-stream, resting against the pole B which forms a stop to support said gate in the predetermined position. The gate is composed of heavy uprights D and cross bars E, the latter being passed through openings or mortises in the uprights. The down-stream ends of the logs A and the lower ends of the uprights D have openings through which a rod F passes to pivotally connect the said parts A and D. A stop G is provided on the gate to limit its downward movement when turned from a vertical or normal position to a horizontal position, thereby preventing injury to the gate and its being carried away. This stop is preferably a stout stick or rod securely fastened to one of the uprights D and designed to engage with the bed of the stream and support the gate in the manner and for the purpose set forth.

In erecting the gate the parts are assembled as shown and secured together in the manner herein more fully specified. Normally the gate is in an approximately vertical position. In a freshet logs, timber and trash banking against the gate on the up-stream side turn it to a horizontal position, or nearly so, which permits the accumulation to pass by without working injury to the gate. The stop prevents the gate from going below a horizontal position which is essential to the safety of the gate.

Having thus described my invention, what I claim as new, and desire to secure by Letters Patent, is—

A flood gate comprising anchoring logs tapering in length and adapted to be placed in parallel relation, a pole connected at its ends to the posts and bracing them laterally, a gate composed of uprights and cross-bars, a rod passing through the uprights and the said posts to connect them together pivotally, said pole supporting the gate in an upright position, and a rod attached to an upright and projecting therefrom and adapted to support the gate in an approximately horizontal position, substantially as described.

In witness whereof I affix my signature in presence of two witnesses.

ELIHU MOON.

Witnesses:
FRANK FOREMAN,
S. A. BYARLAY.